United States Patent
Fujiwara et al.

(10) Patent No.: US 6,346,949 B1
(45) Date of Patent: *Feb. 12, 2002

(54) THREE-DIMENSIONAL FORM DATA PROCESSOR RETAINING INFORMATION ON COLOR BOUNDARIES OF AN OBJECT WHEN THINNING COORDINATE DATA

(75) Inventors: Koji Fujiwara, Sakai; Eiro Fujii, Takatsuki; Shigeaki Imai, Uji; Yoshiko Sakagawa, Ibaraki, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/747,819

(22) Filed: Nov. 13, 1996

(30) Foreign Application Priority Data

Nov. 14, 1995 (JP) ............................. 7-295111

(51) Int. Cl.[7] ............................. G06T 17/00
(52) U.S. Cl. ...................................... 345/589
(58) Field of Search ................. 345/431, 428, 345/419, 420, 425, 421; 382/258

(56) References Cited

U.S. PATENT DOCUMENTS

| | | | | |
|---|---|---|---|---|
| 4,539,704 A | * | 9/1985 | Pastor ........................ 382/258 |
| 4,668,094 A | * | 5/1987 | Matsumoto et al. ........ 356/376 |
| 4,867,570 A | * | 9/1989 | Sorimachi et al. .......... 356/376 |
| 5,050,097 A | * | 9/1991 | Hasebe ....................... 345/501 |
| 5,224,179 A | * | 6/1993 | Denker et al. .............. 382/259 |
| 5,231,678 A | * | 7/1993 | Takatori et al. ............. 382/25 |
| 5,384,866 A | * | 1/1995 | Kumagai ..................... 382/259 |
| 5,444,549 A | * | 8/1995 | Kondo ......................... 358/444 |
| 5,504,845 A | * | 4/1996 | Vecchione .................. 345/419 |
| 5,590,248 A | * | 12/1996 | Zarge et al. ................. 345/421 |
| 5,615,324 A | * | 3/1997 | Kuboyama .................. 345/441 |
| 5,650,828 A | * | 7/1997 | Lee ............................. 348/625 |
| 5,862,252 A | * | 1/1999 | Yamamoto et al. ......... 382/154 |
| 5,971,583 A | * | 10/1999 | Ohnishi et al. ........ 364/468.04 |
| 5,995,650 A | * | 11/1999 | Migdal et al. .............. 382/154 |

FOREIGN PATENT DOCUMENTS

| | | |
|---|---|---|
| JP | 57-157107 | 9/1982 |
| JP | 3-209112 | 9/1991 |
| JP | 4-83133 | 3/1992 |

OTHER PUBLICATIONS

Iwata, Agui, Nagahashi; Boundary Detection of Color Images Using Neural Networks; Proceedings of ICNN '95, IEEE, vol. 3, pp. 1426–1431, 1995.*

Allen and Huntsberger; Comparing color edge detecton and segmentation methods; Southeastcon '89, Proceedings, Energy and Information Technologies in the Southeast., IEEE, vo. 2, pp. 722–728, 1989.*

Moganti, Stoecker and Moss; Detection of Skin Tumor Boundaries in Color Images; IEEE, vol. 12, issue, 3, pp. 624–626, Sep. 1993.*

Greg Turk, "Re–Tiling Polygonal Surfaces," Jul. 1992, pp. 55–64.

* cited by examiner

*Primary Examiner*—Cliff N. Vo
(74) *Attorney, Agent, or Firm*—McDermott, Will & Emery

(57) ABSTRACT

In a processor for generating a three-dimensional form model, data MX on an object having a three-dimensional form are read, while two-dimensional color image GX1 are read in correspondence to the form data MX. Then, color boundaries are discriminated in the color image GX1, and the form data MX are thinned except portions in correspondence to the color boundaries. Thus, the amount of data is reduced without losing information on the color boundaries of the form.

33 Claims, 11 Drawing Sheets

Adjacent polygon : □5874→□5412→□5236→□5698→□5874 (Loop)
Shared side :      Side54  Side52  Side56  Side58

Adjacent polygon : Boundary→□8745→□8569→Boundary
Shared side :      Side87  Side85  Side89

THREE-DIMENSIONAL FORM DATA PROCESSOR RETAINING INFORMATION ON COLOR BOUNDARIES OF AN OBJECT WHEN THINNING COORDINATE DATA

BACKGROUND OF THE INVENTION

1. Field of the Invention

The present invention relates to a processor for generating a three-dimensional form model of an appropriate amount of data from the original three-dimensional form data.

2. Description of the Prior Art

Active stereo methods are used for measuring a form of an object of various kinds including a human body without contact with the object at a fast speed. A slit projection method, referred to light cutting method generally, is a representative method thereof. In these methods, an object is imaged by illuminating it with a light for detection, and a three-dimensional image (or distance image) is generated by using the principle of trigonometry. A three-dimensional image consists of a set of pixels in correspondence to three-dimensional positions of points of the object. The slit light projection method uses a slit light having a linear section as the light for detection.

A three-dimensional form model of a whole object can be generated by imaging the object from a plurality of positions and by synthesizing three-dimensional images appropriately. The three-dimensional form model or a part thereof of an object can be used for computer graphics, computer-aided design or the like.

The pixel density of a three-dimensional image in the above-mentioned active stereo methods are constant in the image. When an object is imaged, the pixel density is usually set high in order to measure complicated portions in the form of the object correctly. Then, even three-dimensional positions of portions having relatively simple forms are read at the same pixel density. Therefore, the number of pixels in the whole picture is large, and an amount of the data on the three-dimensional form of the object becomes excessive. If only a portion of the object is important, the measured data includes data for portions not so important, and the amount of the data for the portions not so important becomes excessive unnecessarily. If the amount of the data is excessive, data processing takes an unnecessary long time for computer graphics or the like, and display speed becomes low.

Various techniques have been proposed to reduce the amount of data of three-dimensional form model using polygon representation. For example, it is proposed to delete a vertex from the data in the order of shortness of the distance of vertices from an average polygon of adjacent polygons until the thinning ratio increases to a specified value ("Dicimation of Triangle Meshes", Computer Graphics, Vol. 26, No. 2, July 1992). It is also proposed to assign triangular meshes to a continuous portion of the same color on the object ("Adaptive Sampling and Reconstruction for Discontinuity Preserving Texture-Mapped Triangulation", Proceedings of IEEE 2nd CAD-Based Vision Workshop, Feb. 8–10, 1994).

However, in the previous techniques, the amount of the three-dimensional form data are reduced irrespective of boundaries of color textures of the object. Therefore, the form data after reduction has limited applications. For example, if a pattern exists on a flat plane of the object, the pattern cannot be extracted as a form component.

SUMMARY OF THE INVENTION

An object of the present invention is to reduce the amount of three-dimensional form data without deleting information on the color boundaries of an object.

In one aspect of the invention, a processor for three-dimensional data of an object receives three-dimensional coordinate data of points of an object, and color image data in correspondence to the coordinate data. Then, color image data are detected at boundaries between first color and second colors different from each other, and the coordinate data are thinned out except the coordinate data in correspondence to the data at the detected boundaries.

An advantage of the present invention is that the amount of three-dimensional form data can be reduced to an appropriate amount of data including useful information, without losing information on color boundaries of the object.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
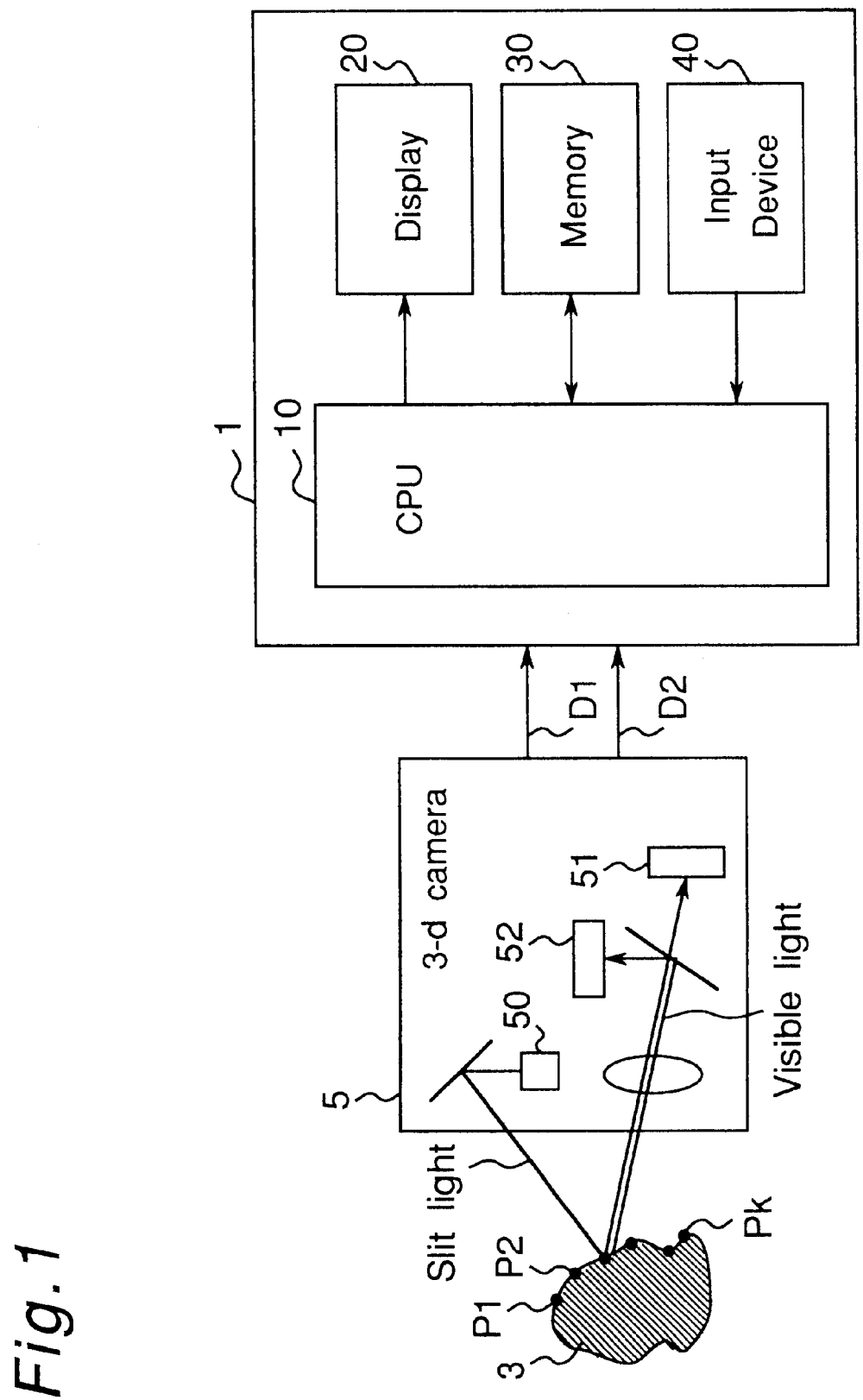
FIG. 1 is a diagram for illustrating a form data generation system according to the invention.

Referring now to the drawings, wherein like reference characters designate like or corresponding parts throughout the views, FIG. 1 shows a form data generation system according to an embodiment of the invention. The system comprises a three-dimensional camera 5 for three-dimensional measurement with slit light projection method and a three-dimensional form data processor 1 having features according to the invention.

The three-dimensional camera 5 comprises a light source 50 for illuminating an object 3 with a slit light, a two-dimensional imaging device 51 for distance measurement which receives the slit light reflected from the object 3, and another two-dimensional imaging device 52 for color measurement. The camera 5 outputs measurement data D1 for specifying three-dimensional positions of a plurality of sampling points $P_1, P_2, \ldots, P_k$, and two-dimensional image data D2 on color information of the object 3. The data D1 are coordinate data of the sampling points obtained by trigonometry or data before subjected to coordinate calculation. In the latter case, the processor 1 performs the coordinate calculation to determine the coordinate data of the sampling points. The two-dimensional data D2 comprises a set of the pixels in correspondence to each of the sampling points. As shown in FIG. 1, the measurement data D1 and the two-dimensional image data D2 are imaged from the same viewing point. The above-mentioned pixels in correspondence to the sampling points means pixels at the same positions or therearound as the sampling points when the measurement data D1 are projected onto the two-dimensional color image D2. Japanese Patent laid open Publication 174536/1995 discloses a measuring instrument having a function similar to the three-dimensional camera 5.

The three-dimensional form data processor 1 comprises a central processing unit (CPU) 10 for data processing, a display 20, memory devices (supplementary storage device) 30, such as a hard disk drive and a flexible disk drive, and input devices 40 comprising a keyboard and a pointing device such as a mouse. The CPU 10 is incorporated with a specified application program. Thus, the processor 1 has a computer system with a general hardware structure.

Next, the operation of the three-dimensional form data processor 1 is explained. The processor 1 reduces the amount of three-dimensional form data of an object from the measurement data D1. The memory 30 stores form data of the object (for example, a wire frame model MX to be explained later) and the two-dimensional image data D2 in correspondence to the form data (imaged from the same viewing point) correlated with each other.

It is assumed here that the form data on which the amount of the data have to be reduced are three-dimensional form model of polygon representation having vertices at the sampling points for measurement with the camera 5. The polygons before data reduction are quadrilaterals. The form data may be form model of the whole object 3 or a part thereof. If the form data of the whole object 3 are processed, gluing is performed for synthesizing form models of a plurality of parts of the object before the amount of the data is reduced. For example, a form model obtained by a measurement from a front side of the object is synthesized with a form model obtained by a measurement from a back side of the object, to generate a form model of the whole object. Gluing is described in detail in Japanese Patent laid open Publication 174536/1995. It is also proposed in Japanese Patent application 156455/1995 to use two-dimensional images in correspondence to each model when corresponding points between form models to be synthesized are specified.

Figure 3:
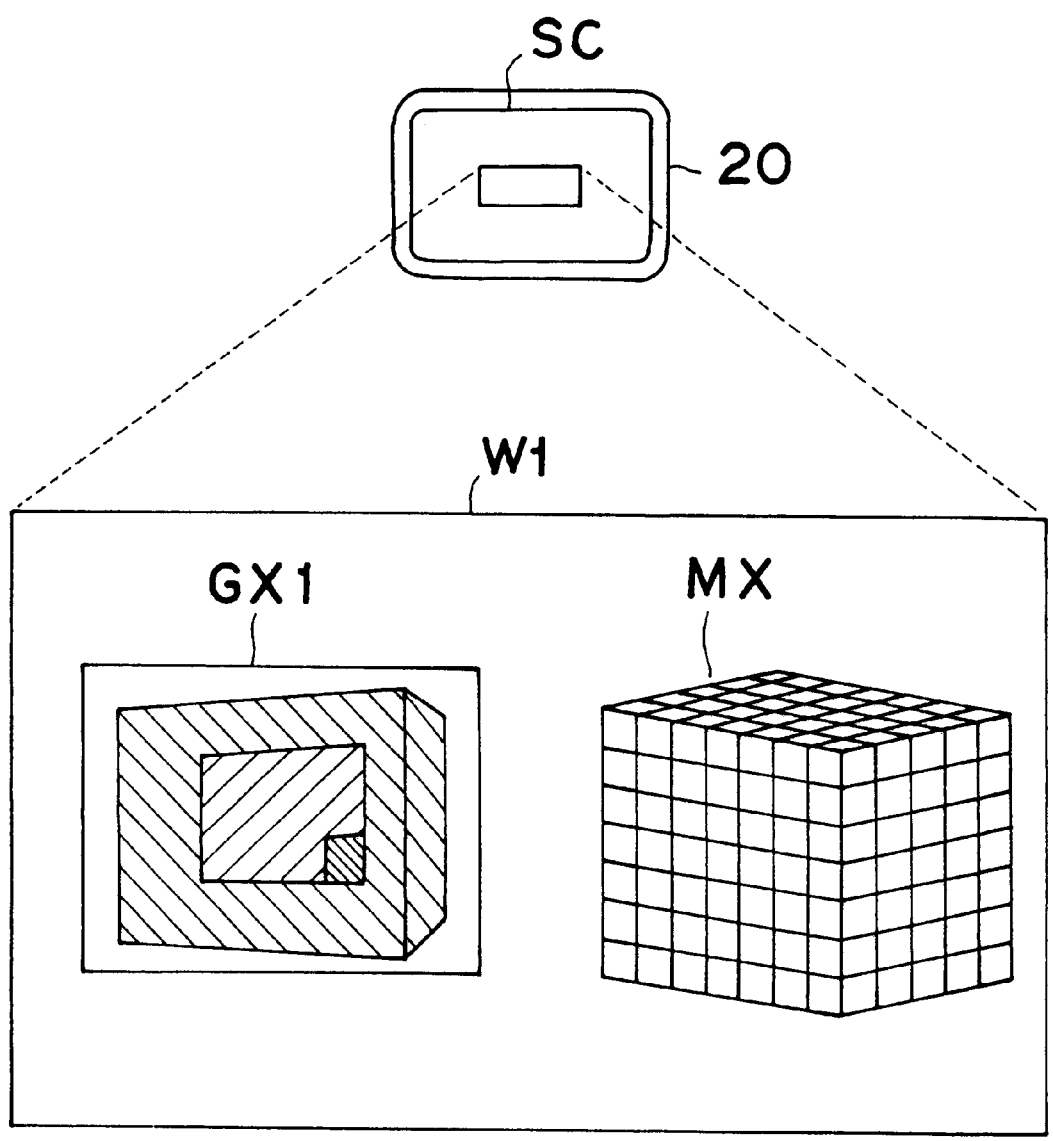
FIG. 3 is a diagram of an example of a main part of a picture on a display device.

The CPU 10 displays a color picture in correspondence to the three-dimensional form data to be processed. FIG. 3 shows an example of a main part SC of a picture on the display device 20. In the example shown in FIG. 3, a color image GX1 and a wire frame model MX are displayed in a window W1 in a screen SC of the display 20. The color image GX1 shows an appearance of two planes of a rectangular parallelepiped object. The wire frame model MX shows patterns of the three-dimensional form data to be processed. The wire frame model MX represents a model of the whole object 3, and it shows a result of gluing.

Figure 2:
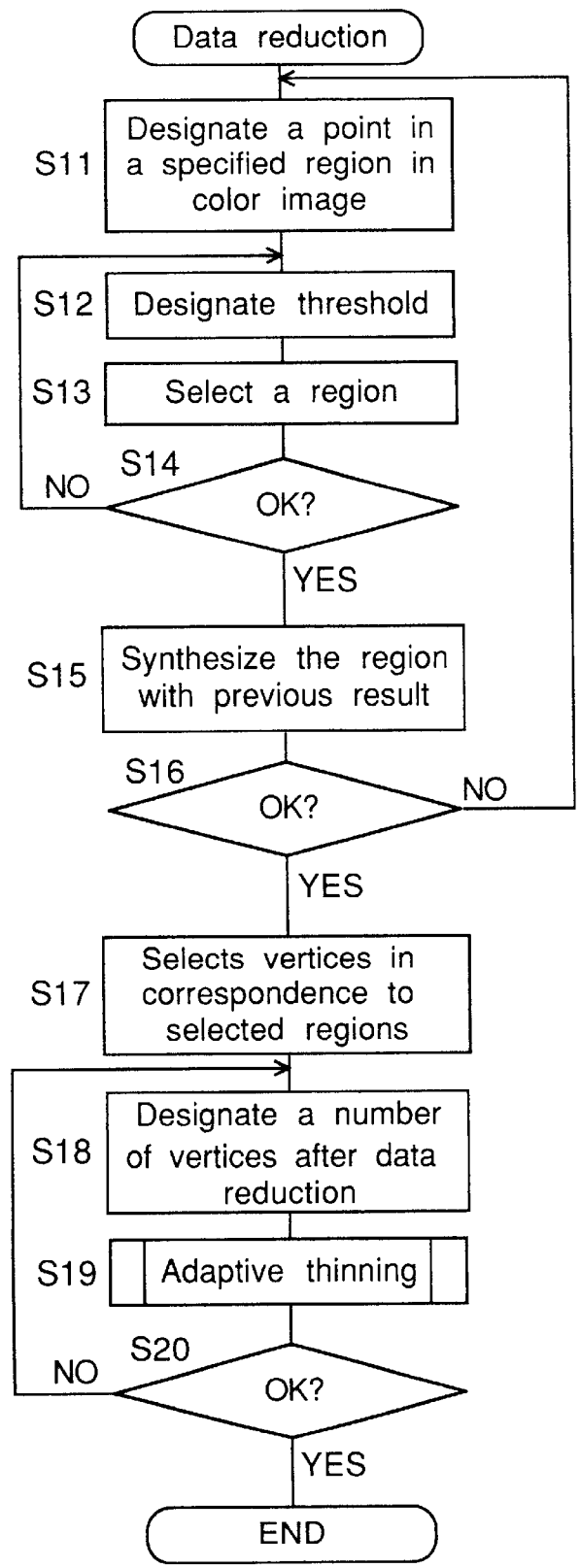
FIG. 2 is a flowchart of reduction of an amount of data.
Figure 4A:
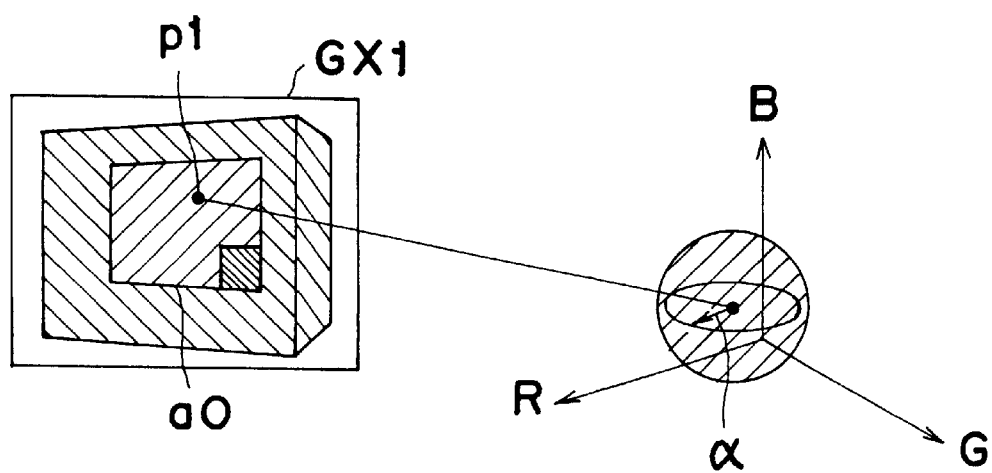
FIGS. 4A and 4B are diagrams for illustrating processes for designating regions.
Figure 4B:
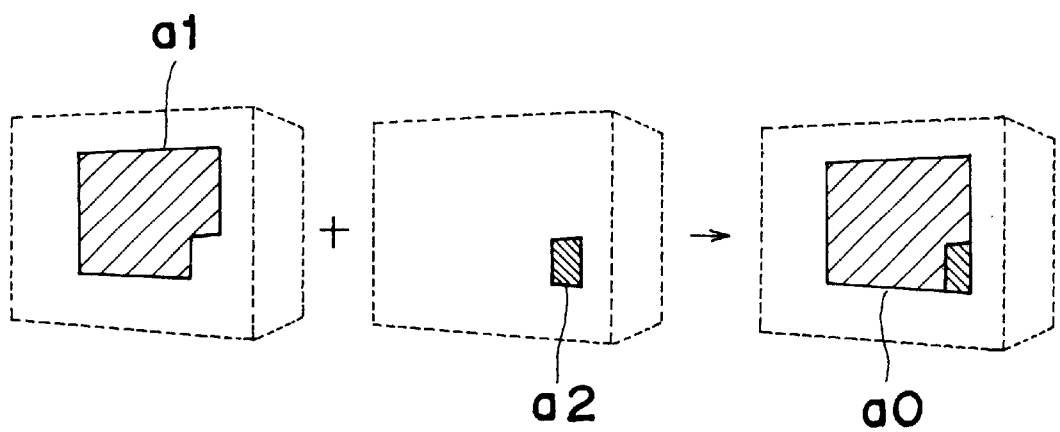

FIG. 2 is a flowchart of data reduction executed by the CPU 10, and FIGS. 4A and 4B illustrate processes for designating regions. In the flow of data reduction shown in FIG. 2, if there is a region in the color image GX1, such as a rectangular region $a_0$ shown in FIG. 4A, on which a user or operator wants to keep contour information, he or she designates a point (pixel) $p_1$ in the region $a_0$ in the screen SC with the mouse 40 (step S11) and specifies a threshold α for defining a color range (step S12). Then, the CPU 10 selects a region $a_1$ including the pixel $p_1$ specified in the color image GX1 as a region to be processed (step S13). The selected region $a_1$ is highlighted or is displayed separately from the color image GX1 in the screen SC. The selected region $a_1$ comprises pixels adjacent to each other, the pixels including only the designated pixel and other pixels having colors similar to the color of the designated pixel. The colors similar to the color of the designated pixel means that the distance from the color of the designated pixel in the RGB space (color coordinate system) is smaller than the threshold α or within a sphere of radius α. If the user decides that the selected region $a_1$ is not appropriate (NO at step S14), the flow returns to step S12, and he or she changes the threshold α.

If the user decides that the selected region $a_1$ is appropriate (YES at step S14), the region is synthesized with regions which have already been selected (step S15). Practically, the whole region $a_0$ which is selected by the user does not necessarily have the similar colors due to a shade or the like. Then, the user selects the region repeatedly if necessary. That is, if the user decides that the result is not good (NO at step S16), the flow returns to step S11. In the example shown in FIG. 4B, two regions $a_1$ and $a_2$ are selected successively to specify the region $a_0$ (or a sum set of the regions $a_1$ and $a_2$).

Next, the data of the obtained region is reduced. First, the CPU 10 selects vertices in correspondence to pixels belonging to the region $a_0$ among the vertices of the wire frame model MX (step S17), and displays a number of the selected vertices. When the color image GX1 are read, the pixels of the color image GX1 have already been correlated to vertices of the wire frame model MX (sampling points $P_k$ on the object 3).

Figure 6:
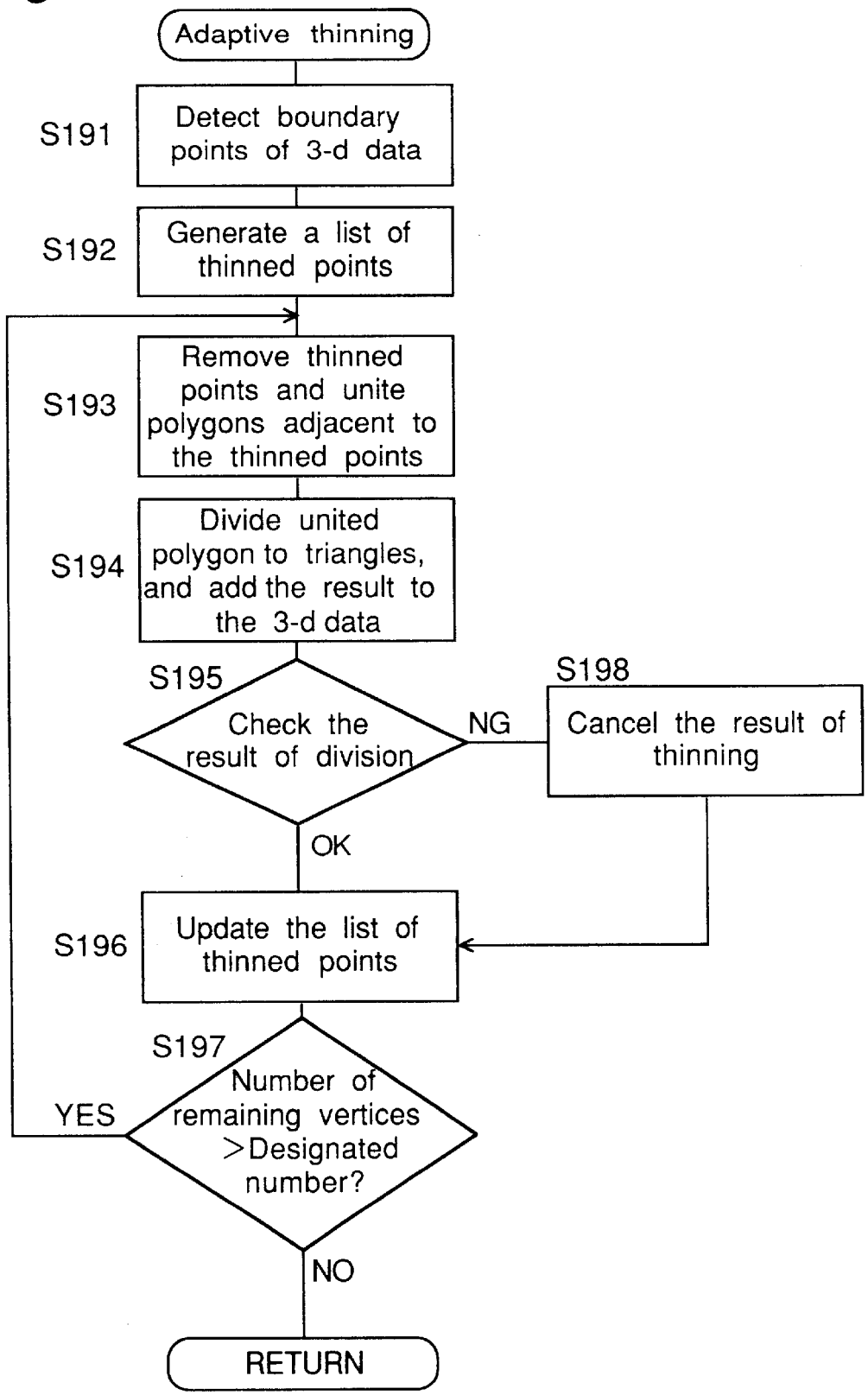
FIG. 6 is a flowchart of adaptive thinning.

Then, the user designates a number of vertices after data reduction as a condition of the date reduction (step S18), and adaptive thinning is performed (step S19, refer to FIG. 6). The steps S18 and S19 are repeated until the user decides that the data reduction is appropriate (YES at step S20). Thus, the amount of the three-dimensional form data are reduced without losing information on color boundaries of the object.

Figure 5:
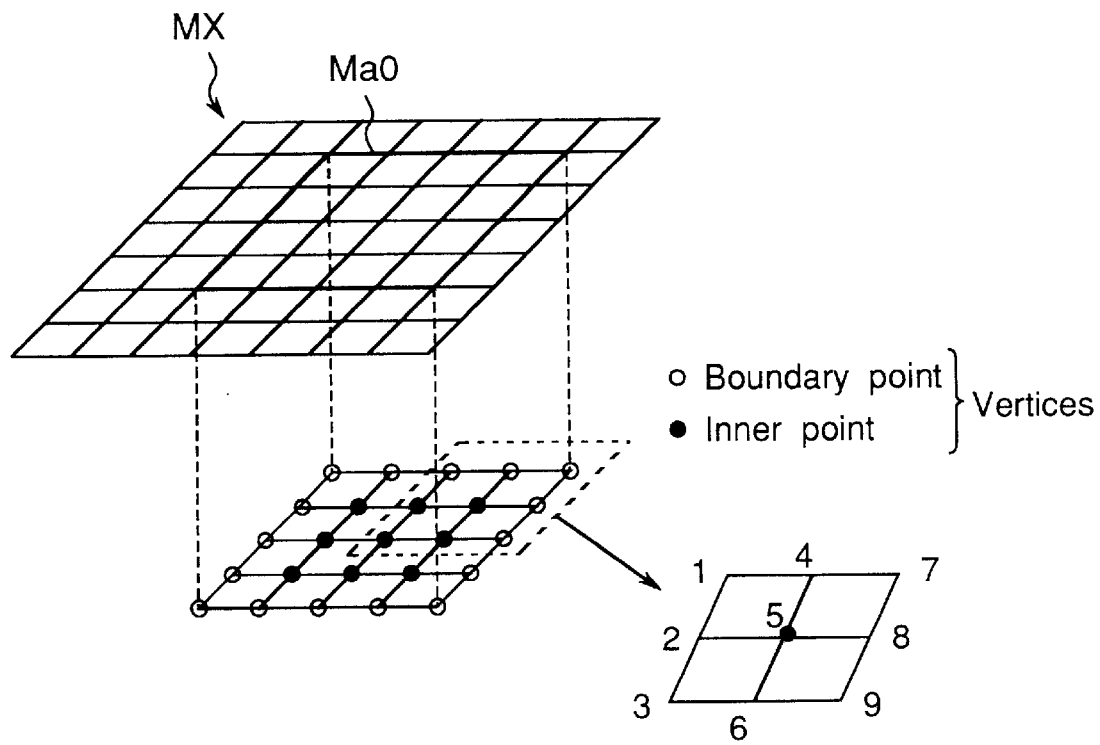
FIG. 5 is a diagram for illustrating discrimination of vertices.
Figure 5:
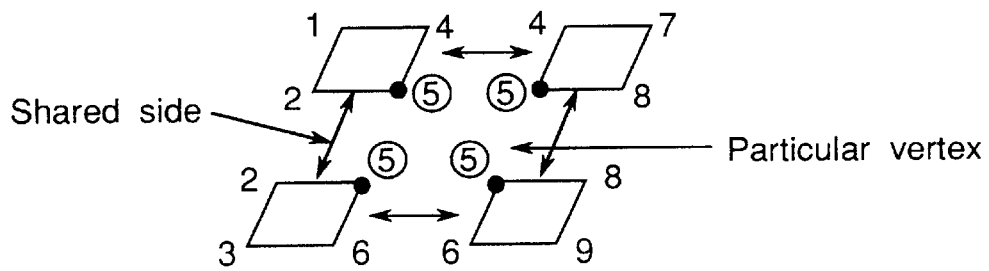
Figure 5:
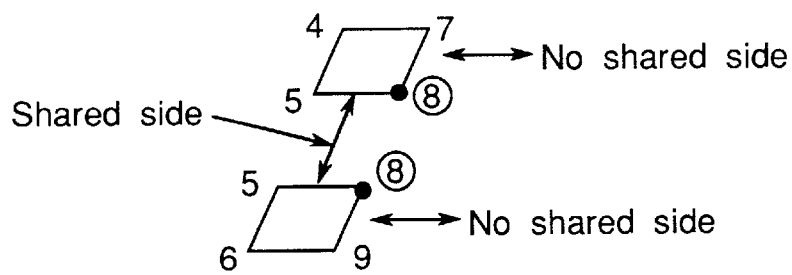

FIG. 5 illustrates discrimination of vertices performed in a flow of the adaptive thinning (step S19 in FIG. 2, FIG. 6). Among the vertices selected at step S17 in FIG. 2, vertices adjacent to vertices not selected and vertices not enclosed by polygons are defined as boundary points of the region $a_0$ (open circles in FIG. 5). Among the vertices selected at step S17, the other vertices than the boundary points are denoted as inner points (solid circles in FIG. 5). The boundary points can be discriminated by separating a part $Ma_0$ in correspondence to the region $a_0$ in the wire frame model MX and by comparing sides including a particular vertex between polygons including the vertex. That is, because adjacent polygons share the particular vertex and a vertex adjacent thereto, if sides shared by the polygons are found to form a loop when the sides are tracked, the particular vertex is decided to be an inner point, otherwise it is decided to be a boundary point. In an example shown in the middle part in FIG. 5, number "5" denotes a particular vertex, while numbers "1", "2", "3", "6", "9", "8", "7" and "4" denoted vertex adjacent to the particular vertex. When the particular vertex "5" is examined, four polygons □5874, □5412, □5236, □5698 including the vertex are found counterclockwise. When the sides 54, 52, 56 and 58 shared by adjacent polygons are tracked, they forms a loop. Then, the particular point "5" is decided to be an inner point. On the other hand, in another example shown in the bottom part in FIG. 5, number "8" denotes a particular vertex. In this example, two polygons □8745, □8569 including the vertex are found in the part Ma$_0$, but the side 85 between the polygons and the boundaries do not form a loop. (The sides 87 and 89 are not shared by adjacent polygons.) Thus, the particular point "8" is decided to be a boundary point.

FIG. 6 shows the adaptive thinning (step S19 in FIG. 2) in detail. A part in correspondence to the region a$_0$ designated by the user is taken out from the three-dimensional form data, and each vertex is classified as a boundary point or an inner point as explained above (step S191). For each inner point, the degree of complicatedness of the model form (local neighborhood form) around the inner point is evaluated as described below, and a list of thinned points is generated for correlating the degree with the inner points (step S192). Then, an inner point is thinned in the order of the simpleness of the local neighborhood form in the list (step S193) until vertices of the number designated by the user are deleted (YES at step S197). Then, the polygons around the deleted inner points are united to a polygon (step S193). Next, the united polygon are divided to triangles, and three-dimensional form data are generated by using the results of division (step S194). That is, the three-dimensional form data are modified. However, it is checked if an inconvenient result happens (step S195). For example, if the model becomes a plane or has intersecting planes (NO at step S195), the thinning at step S193 is canceled (step S198), and the flows proceeds to step S196. As to the vertices having polygons of a direction changed, the complicatedness of the neighborhood forms is evaluated again, and the list of thinned vertices is updated (step S196). Then, if a number of the remaining vertices is decided to be larger than the number designated by the user (YES at step S197), the flow returns to step S193, and the above-mentioned process is repeated to reduce data further. When the number of the remaining vertices becomes the number designated by the user (NO at step S197), the flow returns to the main flow.

Figure 7:
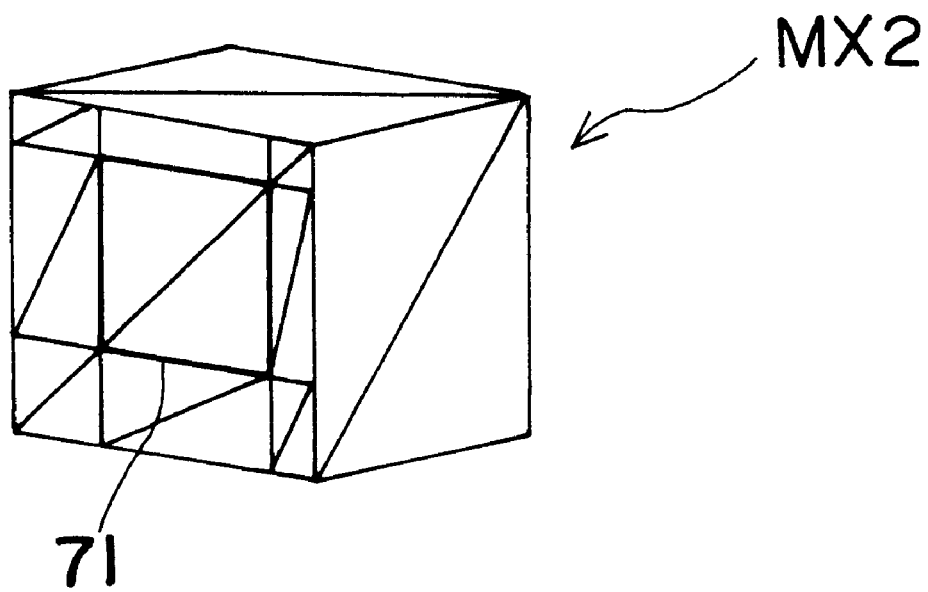
FIG. 7 is a diagram of an example of a result of adaptive thinning.

FIG. 7 shows an example of a result of the adaptive thinning. By comparing FIG. 7 with FIG. 3, it is apparent that the frame model MX shown in FIG. 3 is corrected to the wire frame model MX2 shown in FIG. 7 so as to have information on color boundary on the object and to have a number of vertices smaller than that of the frame model MX shown in FIG. 3. In FIG. 7, a solid line 71 denotes a polygon in correspondence to a color boundary.

Figure 8:
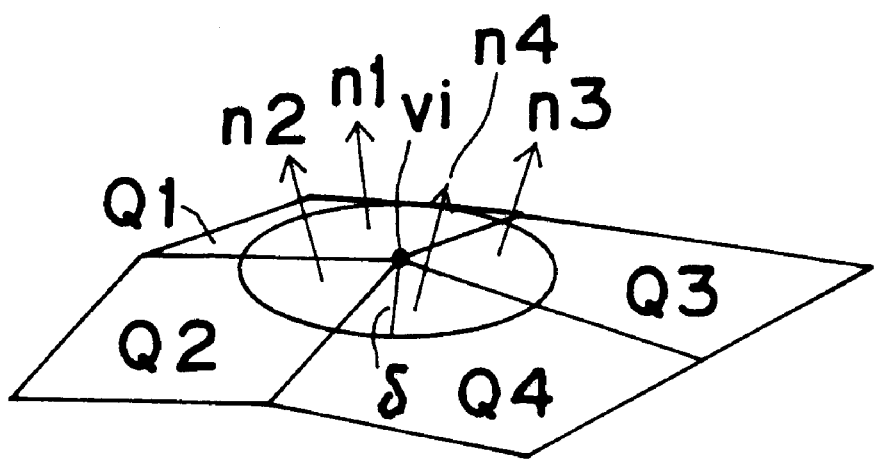
FIG. 8 is a diagram for illustrating a method for evaluating complicatedness of a form near a local neighborhood point.

FIG. 8 illustrates a method for evaluating complicatedness of a form near a local point (refer to step S192 in FIG. 6). An area on a polygon within a small distance δ from a particular vertex $v_i$ is denoted as local neighborhood area. Complicatedness of a form at the i-th vertex $v_i$ (i=1, 2, ..., N) can be expresses as a trace of a covariance matrix C of a primary variation of a unit vector of a normal of an adjacent plane near the vertex. The trace of the matrix C, tr C, is calculated approximately by following relations, wherein a number j (j=1, 2, ..., M$_j$) is assigned to a vertex counterclockwise in vertices adjacent to the i-th vertex $v_i$, ($a_{jx}$, $a_{jy}$, $a_{jz}$) are coordinates of the vertex with the number j, $S_j$ is an area of a local neighborhood region on a polygon including j-th and (j+1)-th vertices, $n_j$ is a unit vector of a normal, and $\theta_j$ is an angle of neighboring sides:

$$trC = \sum p_i(e_{jx}^2 + e_{jy}^2 + e_{jz}^2),$$

where $$e_{jx} = n_{jx} - m_x(m_x n_{jx} + m_y n_{jy} + m_z n_{jz}),$$

$$e_{jy} = n_{jy} - m_y(m_x n_{jx} + m_y n_{jy} + m_z n_{jz}),$$

-continued $$e_{jz} = n_{jz} - m_z(m_x n_{jx} + m_y n_{jy} + m_z n_{jz}),$$

$$m_x = \sum_j p_j n_{jx} / L_m,$$

$$m_y = \sum_j p_j n_{jy} / L_m,$$

$$m_z = \sum_j p_j n_{jz} / L_m,$$

$$L_m = \left[\left(\sum_j p_j n_{jx}\right)^2 + \left(\sum_j p_j n_{jy}\right)^2 + \left(\sum_j p_j n_{jz}\right)^2\right]^{1/2},$$

$$p_j = S_j / \sum_j S_j = \theta_j / \sum_j \theta_j,$$

$$n_{jx} = [a_{jy} a_{(j+1)z} - a_{jz} a_{(j+1)y}] / L_{nj},$$

$$n_{jy} = [a_{jz} a_{(j+1)x} - a_{jx} a_{(j+1)z}] / L_{nj},$$

$$n_{jz} = [a_{jx} a_{(j+1)y} - a_{jy} a_{(j+1)x}] / L_{nj},$$

and $$L_{nj} = [[a_{jy} a_{(j+1)z} - a_{jz} a_{(j+1)y}]^2 + [a_{jz} a_{(j+1)x} - a_{jx} a_{(j+1)z}]^2 + [a_{jx} a_{(j+1)y} - a_{jy} a_{(j+1)x}]^2.$$

Figure 9:
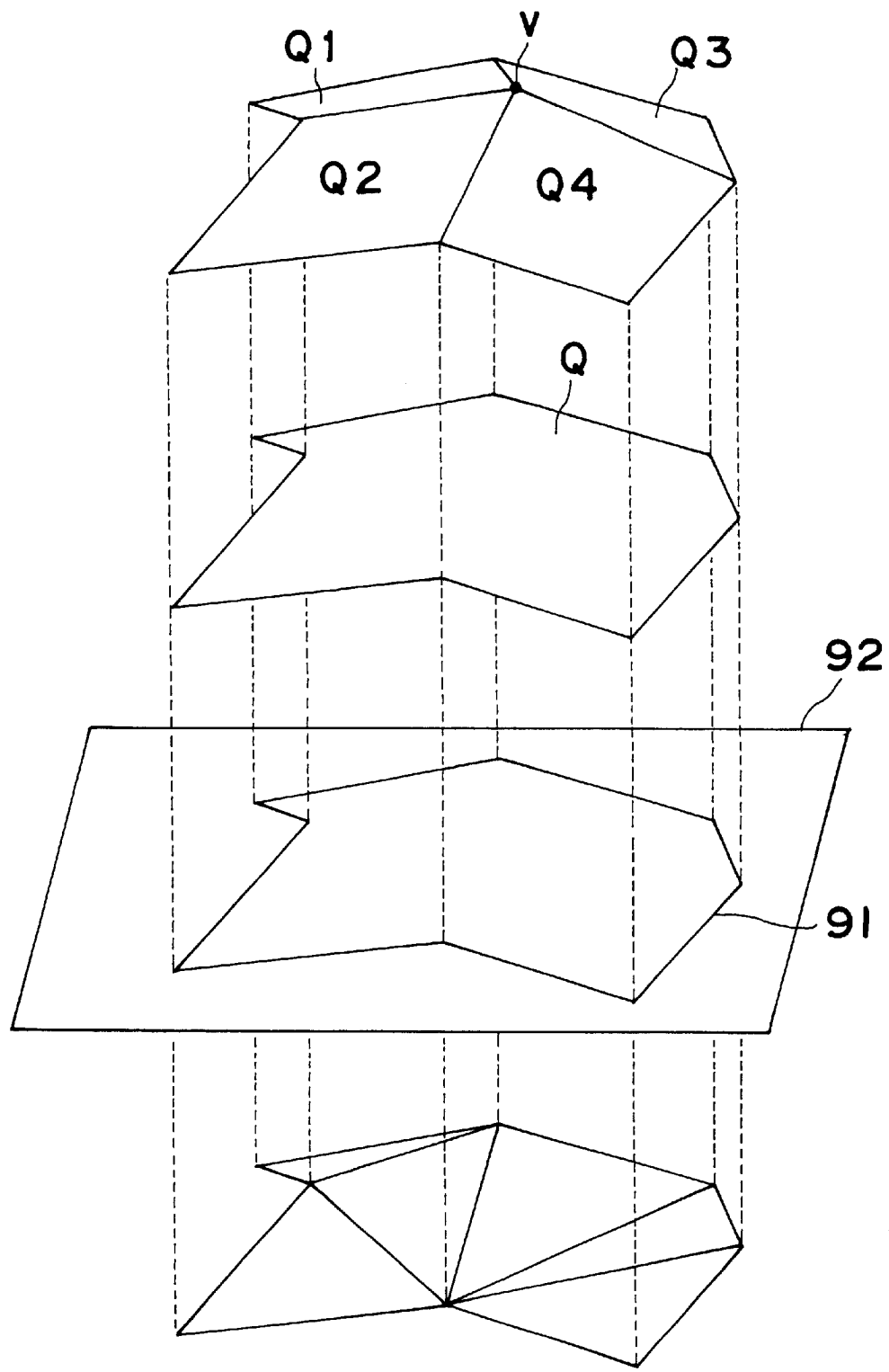
FIG. 9 is a diagram for explaining division of a polygon.

FIG. 9 is a diagram for explaining division of a polygon (steps S193 and S194). A plurality of polygons Q1, Q2, Q3 and Q4 adjacent to a particular vertex v to be thinned out, shown at the top in FIG. 9, is united to form a polygon Q of having N sides or an N-lateral (N≧4). Then, the united polygon Q is divided to triangles as shown at the bottom in FIG. 9. The division is performed by using dynamic programming so that the triangles have a minimum sum of the sides thereof after the division. The division is performed so that sides of the triangles generated by the division (or diagonals of the polygon Q) exists within a projected image 91 of the polygon Q and projected diagonals do not intersect with each other when the polygon Q is projected to an approximation plane 92. Further, if the united polygon Q is degenerated to a flat plane when a polygon is united or glued with other polygons after thinning of the vertices, for example, if a point of a triangular pyramid is thinned out, the vertex is not thinned.

Figure 10:
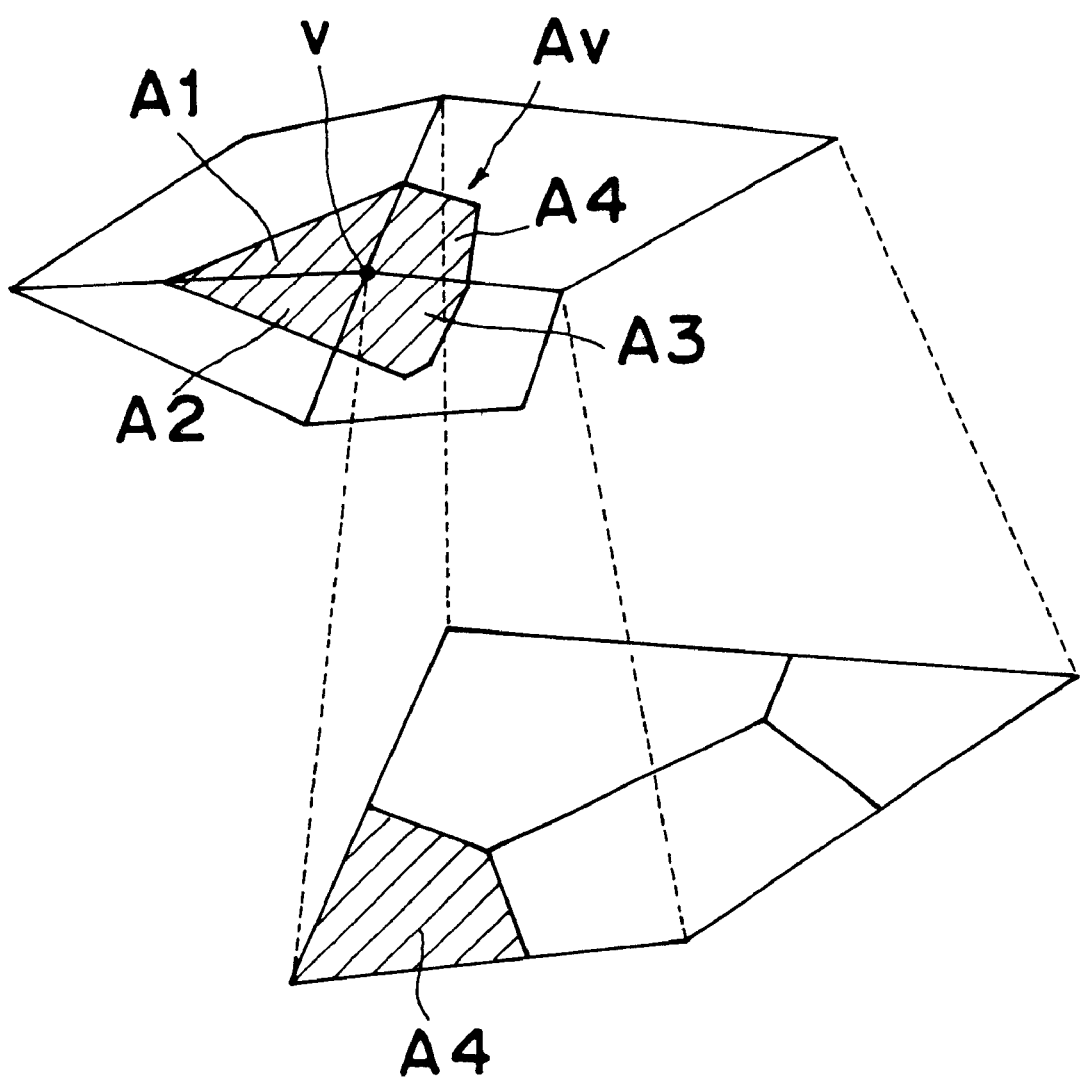
FIG. 10 is a diagram for illustrating thinning based on plane density.

FIG. 10 is a diagram for illustrating thinning (refer to step S193 in FIG. 6) based on local plane density. Data can be reduced as a whole generally uniformly when the above-mentioned ordering of complicatedness of local neighborhood forms is replaced by ordering of local plane density and vertices (or inner points) are thinned in the order of the magnitude of plane density. Plane density ρ around an inner point v is given approximately by a following equation by using an area $S_j$ of a bolonoi area $A_j$ ($A_1$, $A_2$, $A_3$, $A_4$) of the inner point v in each polygon including the inner point v:

$$\rho = 1 / \sum_j S_j.$$

A bolonoi area means an area assigned to each vertex when all the area on a polygon is assigned to vertices having the nearest distance, and it can be obtained by sequential construction of a bolonoi diagram shown at the bottom in FIG. 10.

Figure 11:
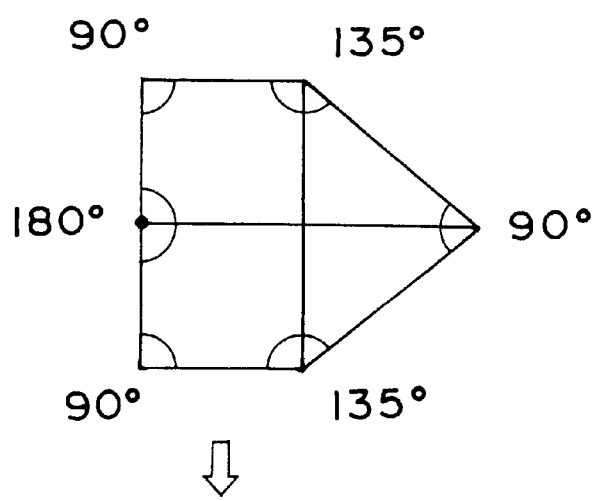
FIG. 11 is a diagram for illustrating thinning based on form.
Figure 11:
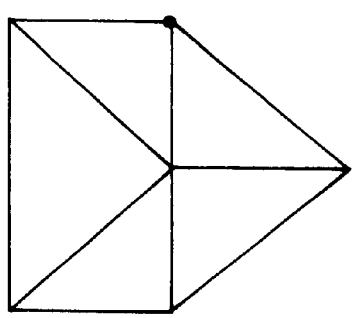
Figure 11:
Figure 11:
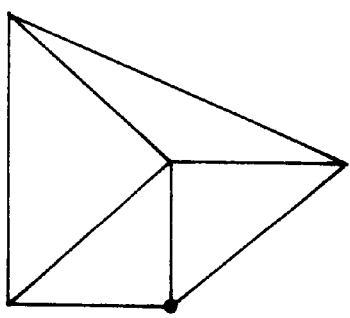
Figure 11:

FIG. 11 illustrates thinning based on shape. The above-mentioned thinning is limited to the inner points. However, the number of boundary points can be reduced by checking an angle between sides having boundary points at their ends, or an inner angle of a polygon, and by thinning boundary points in the order of the magnitude of the inner angle. In an example shown in FIG. 11, a vertex having the largest inner angle of 180° is thinned out first. If it is desired to delete the vertices uniformly, they are thinned in the order of a sum of the lengths of the sides.

Figure 12:
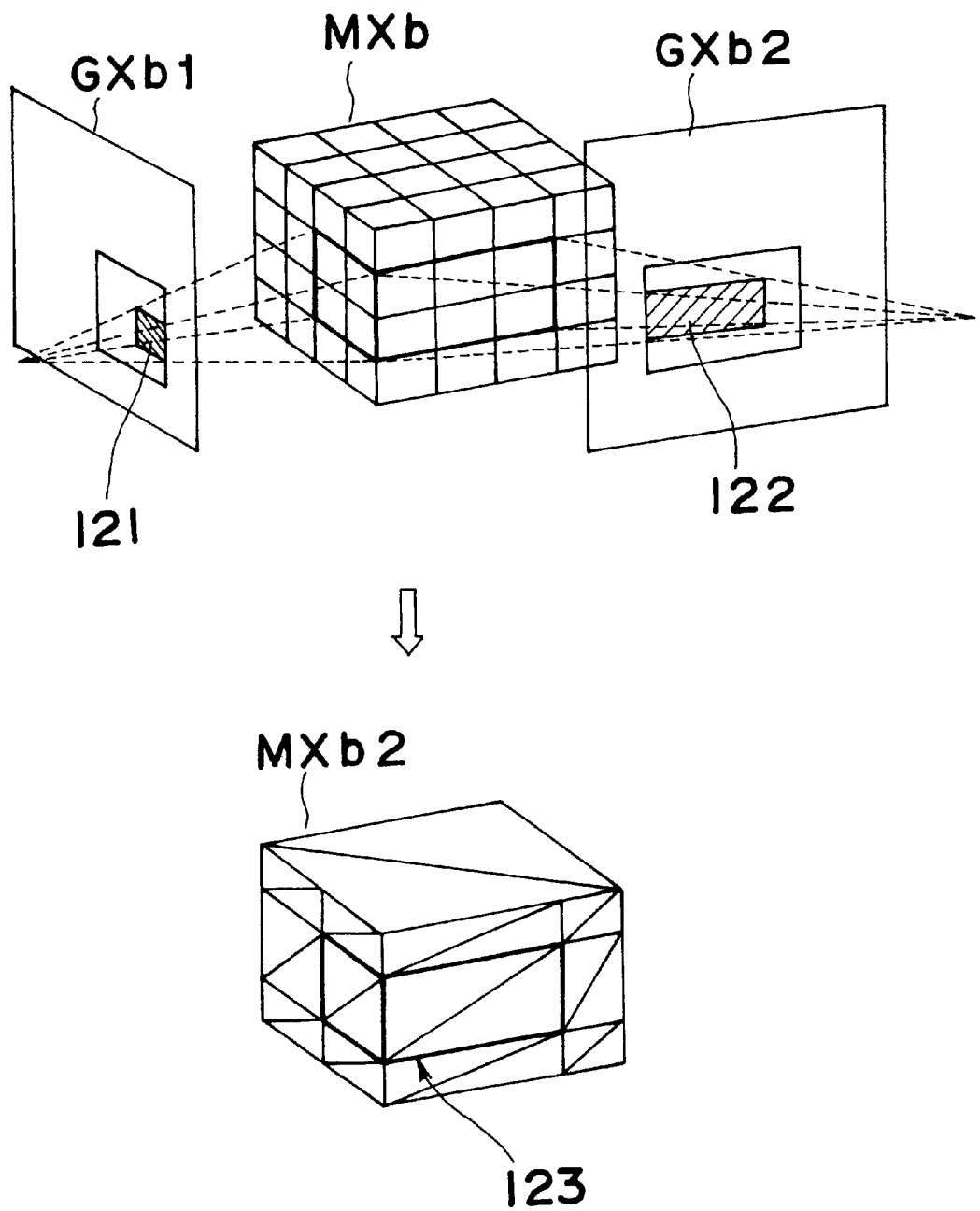
FIG. 12 is a diagram for illustrating reduction of data in a second embodiment of the invention.

FIG. 12 illustrates reduction of data in a second embodiment of the invention. When vertices are thinned in a plurality of parts on an object different from each other, for example, when three-dimensional data of a human face are reduced as to a mouth and eyes, if the procedure shown in FIG. 2 is performed, selection of regions and thinning have to be performed alternately, and it is difficult to perform thinning by taking total harmony in the data into account. In order to solve this problem, all the color boundaries are discriminated in the color images GXb1 and GXb2 of first and second colors, and all the color boundaries are projected onto a three-dimensional form model MXb, as shown at the top in FIG. 12. Then, the boundary points in correspondence to the color boundaries are registered, and they are thinned out at the same time, as shown at the bottom in FIG. 12.

In this embodiment, color images imaged at the same time as the three-dimensional data are used when data of three-dimensional polygon mesh are thinned out as a combination of three-dimensional images obtained by imaging an object 3 viewed at an arbitrary point. Then, data can be reduced while remaining boundaries of color textures easily.

In the embodiment, a user can select a position to be thinned in an object by specifying a color for discriminating color boundaries, and data can be reduced according to usage thereof in an interactive way.

In the embodiment, the processing at step S13 in FIG. 2 corresponds to the discrimination of color boundaries, and the processing at step S19 in FIG. 2 (or processing shown in FIG. 6) corresponds to the correction of the form data.

In the above-mentioned embodiment, form data and color image of an object are not limited to those obtained by imaging an actual object. Information generated by a computer graphics system may also be used.

In the embodiment, data are reduced by reading form data and color images of an object stored in the memory 30. However, the invention can also be applied to a case where form data and color images are read directly from the three-dimensional camera 5, and the form data and the color images are stored in the memory 30 or only the form data are stored after data reduction in the memory 30.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A processor for three-dimensional data of an object, the processor comprising:
    a first input means for inputting three-dimensional coordinate data of points of an object;
    a second input means for inputting color image data in correspondence to the coordinate data of the object input by said first input means;
    a detection means for detecting color image data at boundaries between a first color and a second color different from the first color in the color image data input by said second input means; and
    a thinning means for thinning the coordinate data except the coordinate data in correspondence to the data at the boundaries detected by said detection means.

2. The processor according to claim 1, further comprising a priority means for determining an order of priority for each of three-dimensional coordinate data to be thinned by said thinning means, wherein said thinning means thins the coordinate data according to the order of priority.

3. The processor according to claim 2, wherein said priority means determines the order of priority according to degree of complicatedness of the form of the object around the data to be thinned by said thinning means.

4. The processor according to claim 2, wherein said priority means determines the order of priority according to linear density around the data to be thinned by said thinning means.

5. The processor according to claim 1, wherein said first input means comprises:
    a light source for illuminating the object with a slit light; and
    a read means for reading the slit light reflected from the object;
    wherein said first input means determines the three-dimensional data from the data on the slit light read by said read means by using trigonometry.

6. The processor according to claim 1, further comprising an image display means for displaying the object in two dimensions as a polyhedron having a plurality of quadrilaterals based on the three-dimensional data.

7. The processor according to claim 6, wherein said image display means displays the object with colors based on the color image data.

8. A method for processing three-dimensional data of an object, the method comprising the steps of:
    inputting three-dimensional coordinate data of points of an object;
    inputting color image data in correspondence to the coordinate data of the object;
    detecting data on boundaries between a first color in the color image data and a second color different from the first color; and
    thinning the coordinate data except the coordinate date in correspondence to the data on boundaries detected by said detection means.

9. The method according to claim 8, further comprising the step of determining an order of priority for each of three-dimensional coordinate data to be thinned, wherein the coordinate data are thinned according to the order of priority.

10. The method according to claim 8, further comprising the step of displaying the object in two dimensions as a polyhedron having a plurality of quadrilaterals based on the three-dimensional data.

11. The method according to claim 8, further comprising the step of displaying the object with colors based on the color image data.

12. A processor for processing three-dimensional coordinate data of a plurality of points of an object, said processor thinning the three-dimensional coordinate data based on a boundary between a first portion and a second portion both of which are included in two-dimensional image data of the object, said plurality of portions being mutually different in characters.

13. The processor as claimed in claim 12, wherein said first portion and said second portion are mutually different in colors.

14. The processor as claimed in claim 12, wherein said processor thinning the three-dimensional coordinate data except the three-dimensional coordinate data corresponding to the boundary.

15. The processor as claimed in claim 12, wherein said processor determines an order of priority for each of the three-dimensional coordinate data to be thinned, and wherein said processor thins the three-dimensional coordinate data according to the order of priority.

16. The processor as claimed in claim 15, wherein said processor determined the order of priority according to degree of complicatedness of the form of the object around the three-dimensional coordinate data to be thinned.

17. The processor as claimed in claim 15, wherein the two-dimensional image data is corresponding to the three-dimensional coordinate data.

18. A method for processing three-dimensional coordinate data of a plurality of points of an object, said method comprising the steps of:

(a) determining a boundary between a first portion and a second portion both of which are included in two-dimensional image data of the object; and (b) thinning the three-dimensional coordinate data based on the boundary.

19. The method as claimed in claim 18, wherein said first portion and said second portion are mutually different in color.

20. The method as claimed in claim 18, wherein the thinning in the step (b) is executed for the three-dimensional coordinate data except the three-dimensional coordinate data corresponding to the boundary.

21. The method as claimed in claim 18, wherein the two-dimensional image data is corresponding to the three-dimensional coordinate data.

22. A data processor comprising:

a memory storing three-dimensional coordinate data of a plurality of points of an object, the object including at least one boundary for defining a plurality of areas of the object, each of the plurality of points corresponding to any one of the plurality of the areas and the at least one boundary, and a processing unit for processing the three-dimensional data of the object, said processor executing thinning of the three-dimensional coordinate data except the three-dimensional coordinate data of the points that correspond to the at least one boundary.

23. The data processor as claimed in claim 22, wherein said processor obtains the information on the at least one boundary from two-dimensional image data of the object.

24. The data processor as claimed in claim 23, wherein the plurality of areas are mutually different in color.

25. The data processor as claimed in claim 22, wherein said processor calculates the boundary, and executes thinning of the three-dimensional coordinate data based on the calculated boundary.

26. The data processor as claimed in claim 25, wherein said processor calculates the boundary based on two-dimensional image data of the object.

27. The data processor as claimed in claim 25, wherein said processor calculates the boundary based on colors represented by the two-dimensional image data of the object.

28. A computer system for processing three-dimensional coordinate data of a plurality of vertices of an object, said computer system comprising:

an input device from which an operator of the computer system is capable of inputting instructions; and a processing unit connected with the input device, said processing unit accepting instructions on a first designation and a second designation from the input device, the first designation regarding a designation of at least one area of the object and the second designation regarding a designation of a reduction condition of the three-dimensional coordinate data of the at least one area, said processing unit reducing a number of vertices of the three-dimensional coordinate data within the at least one area in accordance with the reduction condition.

29. The computer system as claimed in claim 28, wherein the first designation is executed by designing a color of a two-dimensional image of the object displayed on a display of the computer system.

30. The computer system as claimed in claim 28, wherein the second designation is executed by designating a numerical number that is a number of vertices of the three-dimensional coordinate data within the at least one area after the reduction of the three-dimensional coordinate data.

31. The computer system as claimed in claim 28, wherein the reduction of the three-dimensional coordinate data is executed in accordance with an adaptive thinning process.

32. The computer system as claimed in claim 28, wherein said processing unit waits an approval of the operator after the reduction of the three-dimensional coordinate data.

33. The computer system as claimed in claim 28, wherein the three-dimensional coordinate data corresponding to at least one boundary of the at least one area is out of object of the reduction of the three-dimensional coordinate data.

* * * * *